United States Patent
Falla et al.

(10) Patent No.: US 6,793,972 B2
(45) Date of Patent: Sep. 21, 2004

(54) GAS PERMEATION RESISTANT SYNTHETIC CORK CLOSURE

(75) Inventors: Daniel J. Falla, Sarnia (CA); Michael L. Mounts, Midland, MI (US); Deborah E. Plaver, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 135 days.

(21) Appl. No.: 09/950,345

(22) Filed: Sep. 10, 2001

(65) Prior Publication Data

US 2003/0031881 A1 Feb. 13, 2003

Related U.S. Application Data

(60) Provisional application No. 60/232,019, filed on Sep. 12, 2000.

(51) Int. Cl.⁷ .................................. B05D 1/02
(52) U.S. Cl. ................. 427/368; 427/393.5; 427/421
(58) Field of Search ............................ 427/393.5, 368, 427/421, 385.5

(56) References Cited

U.S. PATENT DOCUMENTS

| | | |
|---|---|---|
| 2,752,059 A | 6/1956 | Schneider |
| 3,642,743 A | 2/1972 | Schuetz et al. |
| 3,817,780 A | 6/1974 | Hinkamp et al. |
| 3,879,359 A | 4/1975 | Hinkamp et al. |
| 4,351,929 A | 9/1982 | Gibbs et al. |
| 4,363,849 A | 12/1982 | Paisley et al. |
| 4,451,632 A | 5/1984 | Gibbs et al. |
| 5,084,510 A * | 1/1992 | Braden et al. ............... 525/66 |
| 5,496,862 A | 3/1996 | Burns |
| 5,710,184 A | 1/1998 | Burns |
| 5,849,418 A * | 12/1998 | Hoenig et al. ............ 428/500 |
| 5,855,287 A | 1/1999 | Burns |
| 5,904,965 A | 5/1999 | Noel et al. |
| 5,929,128 A * | 7/1999 | Whetten et al. ............ 521/85 |
| 5,975,322 A | 11/1999 | Reid |
| 2002/0103275 A1 * | 8/2002 | Nogueria de Sousa et al. .. 524/16 |

FOREIGN PATENT DOCUMENTS

| | | |
|---|---|---|
| DE | 26 22012 | 1/1977 |
| DE | 42 25 092 | 7/1992 |
| GB | 810786 | 3/1959 |
| GB | 1087801 | * 10/1967 |
| JP | 60-192629 | * 10/1985 |
| WO | WO 96/28378 | * 9/1996 |
| WO | WO 2000/64647 | * 11/2000 |
| WO | WO 2000/64648 | * 11/2000 |
| WO | WO 2000/64649 | * 11/2000 |

OTHER PUBLICATIONS

Schaeffer, Semana Vitivinicola, 33(1.677), pp 3853/5/7/9, 1978.*

* cited by examiner

*Primary Examiner*—Erma Cameron

(57) ABSTRACT

A synthetic cork closure having at least a portion thereof coated with a gas impermeable polymer coating composition.

16 Claims, No Drawings

GAS PERMEATION RESISTANT SYNTHETIC CORK CLOSURE

This application claims the benefit of U.S. Provisional Application No. 60/232,019, filed Sep. 12, 2000.

BACKGROUND OF THE INVENTION

This invention relates to synthetic cork closures for liquid containers and to processes for making such closures.

Synthetic corks are typically made from a foamed polymer and are formed using either a profile extrusion method or injection molding or may be punched out of foamed sheets. Hybrid corks also exist where natural cork is ground and recombined using binding agents. Synthetic corks and processes for preparing them are described in U.S. Pat. Nos. 5,975,322, 5,904,965, 5,855,287, 5,710,184, 5,496,862 and 4,363,849. All of these synthetic corks and hybrid corks suffer from the uncontrolled permeation of gases in and out of the cork and the scalping of flavors caused by the polymers used.

It would be desirable to provide synthetic corks that have high resistance to the permeation of gases in and out of the cork.

SUMMARY OF THE INVENTION

In a first aspect, the present invention is a synthetic cork closure having at least a portion thereof coated with a gas impermeable polymer coating composition.

In a second aspect, the present invention is a process for preparing the closure of the first aspect which comprises providing a synthetic cork closure and coating at least a portion thereof with a gas impermeable polymer coating composition.

In a third aspect, the present invention is a process for preparing the closure of the first aspect which comprises inserting the synthetic closure into a container, dripping the gas impermeable coating composition onto the free end of the closure and allowing the solvent in the coating composition to evaporate.

DETAILED DESCRIPTION OF THE INVENTION

The synthetic cork closures which can be employed in the practice of the present invention include the synthetic closures described in U.S. Pat. Nos. 5,975,322, 5,904,965, 5,855,287, 5,710,184, 5,496,862 and 4,363,849, incorporated herein by reference. Most preferred synthetic cork closures are those which are commercially available from Neocork Technologies, Inc., Napa Valley, Calif.

The gas impermeable coating composition of the present invention can be prepared by dissolving a gas impermeable polymer in a volatile organic solvent solution. Preferably, the organic solvent solution comprises a blend of a solvent and a cosolvent. The organic solvent dissolves the gas impermeable polymer. The cosolvent is employed to control solvent evaporation rate and to dissolve any additives which can not be dissolved by the solvent. If the gas impermeable polymer is vinylidene chloride polymer, the cosolvent is also used to control the vinylidene chloride polymer crystallinity.

The gas impermeable polymers which can be employed in the practice of the present invention include vinylidene chloride polymers and copolymers, polychlorotrifluoroethylene, polyethylene terephthalate and polyisobutylene. The most preferred gas impermeable polymers are vinylidene chloride polymers.

The vinylidene chloride polymers which can be employed in the practice of the present invention are well-known in the art. See, for example, U.S. Pat. Nos. 3,642,743 and 3,879,359. The most common PVDC resins are known as SARAN™ resins, manufactured by The Dow Chemical Company. As used herein, the term "vinylidene chloride polymer" or "PVDC" encompasses homopolymers of vinylidene chloride, and also copolymers and terpolymers thereof, wherein the major component is vinylidene chloride and the remainder is one or more monoethylenically unsaturated monomers copolymerizable with the vinylidene chloride monomer. Monoethylenically unsaturated monomers which can be employed in the practice of the present invention for preparing the vinylidene chloride polymers include vinyl chloride, alkyl acrylates, alkyl methacrylates, acrylic acid, methacrylic acid, itaconic acid, acrylonitrile, and methacrylonitrile. Preferred ethylenically unsaturated monomers include vinyl chloride, acrylonitrile, methacrylonitrile, alkyl acrylates, and alkyl methacrylates. More preferred ethylenically unsaturated monomers include vinyl chloride, acrylonitrile, methacrylonitrile, and the alkyl acrylates and alkyl methacrylates having from 1 to 8 carbon atoms per alkyl group. Most preferred ethylenically unsaturated monomers are vinyl chloride, methyl acrylate, ethyl acrylate, and methyl methacrylate, acrylonitrile, and methacrylonitrile.

Preferably, the vinylidene chloride copolymer is (1) a copolymer of (a) from about 80 to about 93 mole percent vinylidene chloride and (b) from about 20 to about 7 mole percent of at least one monoethylenically unsaturated monomer copolymerizable therewith (SARAN F-278) or (2) a copolymer of (a) from about 65 to about 75 mole percent vinylidene chloride and (b) from about 35 to about 25 mole percent of at least one monoethylenically unsaturated monomer copolymerizable therewith (SARAN F-310).

The above vinylidene chloride polymers and processes for preparing them are well known. See, for example, U.S. Pat. Nos. 3,817,780; 3,879,359; 4,351,929 and 4,451,632, incorporated herein by reference.

The organic solvents which can be employed in the practice of the present invention for preparing the solvent mixture include acetone, methyl ethyl ketone, cyclohexanone, ethyl acetate, n-propyl acetate, isopropyl acetate, propylene oxide, dioxane, tetrahydrofuran and mixtures thereof. Preferred solvents are methyl ethyl ketone, acetone, ethyl acetate and tetrahydrofuran. More preferred solvents are methyl ethyl ketone, acetone, and tetrahydrofuran, with methyl ethyl ketone as the most preferred. Cosolvents which can be employed in the practice of the present invention for preparing the solvent mixture include aliphatic and alicyclic hydrocarbons, such as hexane, heptane, cyclohexane, cyclohexene, methylcyclohexane and dialkylethers, such as t-amyl methyl ether. Most preferred cosolvents are methylcyclohexane and heptane. Most preferred is methylcyclohexane.

A commonly known organic solvent system, which is a mixture of the solvent THF (tetrahydrofuran) and the cosolvent toluene, can be employed in the practice of the present invention for preparing the gas impermeable coating composition.

The coating composition may also contain various additives to impart desirable properties such as, for example, slip properties, to the finished coating.

The amount of solvent and cosolvent used in the solvent mixture depends on many factors such as the composition and solubility of vinylidene chloride polymer, the desired flow characteristics of the coating, desired pot life and drying time, desired coating thickness, and desired wettability of the closure the type of cosolvent employed, vinylidene chloride crystallinity and the temperature at which the vinylidene chloride and other additives are dissolved. In general, the solvent is used in an amount of from about 50 to 85 weight percent, preferably from about 60 to about 80 weight percent and, most preferably, in an amount of from about 65 to about 75 weight percent, based on the weight of the solvent mixture and the balance is the cosolvent.

The thixotropic agent which can be employed in the practice of the present invention include fumed silica, kaopolite, bentonites, talc, or mixtures thereof.

The amount of thixotropic agent employed in the practice of the present invention for preparing the coating composition depends on desired flow characteristics of the coating, the specific method of applying the coating, and the desired coating thickness.

In general, this amount is from about 0 to about 25 wt. % based on the weight of the composition. Preferably, the gas impermeable polymer coating composition comprises from about 5 weight percent to about 20 weight percent of a vinylidene chloride polymer, from about 70 weight percent to about 90 weight percent of an organic solvent or blend of organic solvents and, from about 5 weight percent to about 10 weight percent of a thixotropic agent. The coating composition can be prepared by methods known in the art such as by dissolving a vinylidene chloride polymer or resin in a volatile organic solvent mixture at a temperature and for a time sufficient to dissolve substantially all of the vinylidene chloride resin.

The synthetic cork closure of the present invention can be prepared by providing a synthetic cork closure and applying a coating of the gas impermeable polymer composition to at least a portion of the surface thereof. For example, the coating may be applied only to the surface of the closure that is likely to contact the contents of the container, such as one or both ends of the synthetic cork closure, or it can be applied to the whole surface of the cork closure.

The coating composition can be applied onto the surface of the synthetic cork closure by methods known in the art such as, for example, by analox gravure coating, offset coating, pad print coating, screen or stencil coating, brush coating, and spray coating. In gravure coating, the coating composition is doctored onto an inert surface and either pressed onto the closure or transferred to an offset pad, which in turn is used to apply the coating to the closure. Likewise, a pad print system can be used to transfer the coating in a controlled amount from a cliche to the closure by means of an elastomeric pad. Brush and spray coating are very conventional techniques which can be used to apply the coating to the closure, albeit in a less-controlled manner. Another method is applying the coating by means of a silk-screen or stencil process involving a squeegee. Depending on the solvent system, for any of these methods, the coating can be applied from an open well or a closed cup system. These are all methods well-known to those skilled in the art of applying coatings to surfaces.

The coating composition can be applied onto the surface of the synthetic cork closure after it has been inserted into a container. For example, the coating composition, which comprises a vinylidene chloride copolymer dissolved in a solvent, can be applied to the inserted closure by dripping the coating composition onto the free end of the closure and allowing the solvent to evaporate.

Any residual solvent in the coating can be removed by conventional methods such as, for example, by drying the coated substrate in a forced-air oven. Advantageously, the coated substrate is dried for a period of time and at a temperature sufficient to remove the solvent and develop crystallinity, if required, in the finished coating. The temperature and length of time can be easily determined by those skilled in the art without undue experimentation. The following examples are for illustrative purposes only and are not intended to limit the scope of this invention. Unless otherwise indicated, all parts and percentages are by weight.

EXAMPLES

The synthetic corks used in the following Examples were obtained from Neocork Technologies, Inc., Napa Valley, Calif.

The synthetic corks comprise an outer skin of a styrene ethylene butadiene styrene (SEBS) and an inner core of foamed AFFINITY™ PF1140, a homogeneously branched, substantially linear ethylene/α-olefin polymer, which is a product of The Dow Chemical Company. Some of the synthetic corks were plasma-treated to 42 dynes. The natural corks were purchased from a local wine supply store.

The following coating compositions were used in the Examples:
(1) SARAN™ F-310 and 1 wt % Solvent Violet 33 dye
(2) 7.5 wt % of Coating Composition 1 and 92.5 wt % methyl ethyl ketone (MEK)
(3) 15 wt % of Coating Composition 1 and 85 wt % methyl ethyl ketone (MEK)
(4) Polyurethane Primer -9 parts by weight MORTON ADCOTE™ 57R2 and 1 part by weight COREACTANT™ F
(5) A mixture of 10% by weight SARAN F-310, 8% by weight KORTHIX™, 8% toluene, and 74% MEK
(6) A mixture of 25% by weight SARAN F-310 and 75% by weight of acetone.

SARAN F-310 is a copolymer of from about 65 to about 75 mole percent vinylidene chloride and (b) from about 35 to about 25 mole percent of at least one monoethylenically unsaturated monomer copolymerizable therewith.

Solvent Violet 33 dye is an anthraquinone dyestuff available from Mitsubishi Chemical Corporation as Diaresin™ Blue J. Solvent Violet 33 has a melting point of 143° C.

The Solvent Violet 33 dye was added to the solution so that the coatings could be seen.

ADCOTE™ 57R2 is a polyester available from Morton International.

COREACTANT™ F is an isocyanate available from Morton International.

Polyurethane Primer—nine parts by weight of ADCOTE 57R2 blended with 1 part of COREACTANT F, then diluted with an equal amount of methyl ethyl ketone to achieve the desired viscosity.

KORTHIX™ is a bentonite clay available from Kaopolite Corporation.

Example 1

Coverage and Adhesion Tests

Coating compositions 2 and 3 were applied to some of the corks by painting, using a paint brush, rollering, using a paint roller, dipping and dripping onto the surface of the cork. The coated corks were allowed to dry in a convection air oven set at 70° C. for 5 minutes. The coated and uncoated corks were then examined using a light microscope to look at the coverage of the barrier coating.

The violet solution was found to completely cover the surface of the cork. Using light microscopy the violet solution was seen to have penetrated down into the open cells of the cork. A sharp pick was used to try and "pick-off" the coating on the cork. Samples of the cork were crushed using a hand held, jaw type corking unit. It was found that the coating could not be removed from both the treated and untreated cork surfaces. Adhesive tape also failed to remove the coating on the cork.

Example 2

Natural Corks

Both ends of 20 natural corks were coated with either Coating Composition 1 or 2. No pretreatment to increase the adhesion between the cork surface and the coating composition was done. Excellent adhesion was observed between the cork and the barrier coating.

Example 3

Bottle Trials

The following corks were inserted into 750 mL wine bottles. The corks were coated with Coating Composition 1 or 2, as indicated in Table 1. The corks were also spray-coated with a silicone lubricant to facilitate easy removal from the bottle. Samples 1S–9S are synthetic corks and Samples 1N to 7N are natural corks.

TABLE 1

| Cork Type | Coating Composition | # of Corks Coated | Surface Coated | % PVDC Solids |
|---|---|---|---|---|
| 1S | 2 | 10 | Both ends | 7% |
| 2S | 3 | 10 | Both ends | 15% |
| 3S | 2 | 5 | Both ends | 7% |
| 4S | 3 | 5 | Both ends | 15% |
| 5S | 2 | 5 | All surfaces | 7% |
| 6S | 3 | 5 | All surfaces | 15% |
| 7S | 2 | 5 | All surfaces | 7% |
| 8S | 3 | 5 | All surfaces | 15% |
| 9S | — | 10 | None | 0% |
| 1N | 2 | 5 | Both ends | 7% |
| 2N | 3 | 5 | Both ends | 15% |
| 3N | 2 | 5 | All surfaces | 7% |
| 4N | 3 | 5 | All surfaces | 15% |
| 5N | 2 | 5 | All surfaces | 7% |
| 6N | 3 | 5 | All surfaces | 15% |
| 7N | — | 5 | None | 0% |

Example 4

The corks described in Table 1 were inserted into wine bottles. The tops of the bottles were cut off and mounted on a plate using epoxy. The gas permeation rates were determined using a Mocon test unit. The following Tables 2 and 3 show that application of the SARAN coating to the natural cork significantly reduced the permeation property of the natural cork and reduced the permeation properties of the synthetic cork by more than 50%.

TABLE 2

SAMPLES A, B, C, D AND E ARE NON-COATED SAMPLES

| | Comparative Example | | | | |
|---|---|---|---|---|---|
| | A | B | C | D | E |
| | | | Cork Type | | |
| | 7N | 7N | 7N | 9S | 9S |
| | #days purge time in Vacuum | | | | |
| | 0 | 4 | 0 | 0 | 7 |
| | OTR* | OTR* | OTR* | OTR* | OTR* |
| Day 1 | 12.91 | 12.02 | | too high | |
| Day 2 | 12.65 | 10.08 | | 0.1792 | |
| Day 3 | 11.59 | 9.95 | | 0.1425 | |
| Day 4 | 12.73 | 11.04 | | 0.1314 | 0.1352 |
| Day 5 | 11.07 | 10.05 | | 0.1157 | 0.0990 |
| Day 6 | | 9.42 | 13.02 | 0.1117 | 0.0974 |
| Day 7 | | 9.76 | 12.79 | 0.1033 | 0.0801 |
| Day 8 | | 9.25 | 12.25 | 0.0985 | 0.0762 |
| Day 9 | | 9.74 | 12.25 | 0.0895 | 0.0690 |
| Day 10 | | 12.02 | | 0.0894 | 0.0682 |
| Day 11 | | 10.08 | | 0.0847 | 0.0657 |
| Day 12 | | 9.95 | | 0.0848 | 0.0652 |
| Day 13 | | 11.04 | | 0.0828 | 0.0638 |
| Day 14 | | 10.05 | | 0.0773 | 0.0582 |
| Day 15 | | 9.76 | | 0.0743 | 0.0656 |
| Day 16 | | | | 0.0743 | 0.0605 |
| Day 17 | | 9.25 | | 0.0704 | 0.0585 |
| Day 18 | | 9.74 | | 0.0671 | 0.0562 |
| Day 19 | | | | 0.0683 | 0.0613 |
| | Epoxy applied to edge of Cork #1 | | | | |
| | | 8.38 | | | |
| Final OTR* | 11.07 | 8.38 | 12.25 | 0.0683 | 0.0613 |

*OTR - Oxygen transmission rate in cc/bottle-day-atm.

TABLE 3

Saran Coated Samples - Both ends coated

| | Example | | | | | | | |
|---|---|---|---|---|---|---|---|---|
| | 1 | 2 | 3 | 4 | 5 | 6 | 7 | 8 |
| | | | | Cork Type | | | | |
| | 1S | 1S | 2S | 2S | 1N | 1N | 2N | 2S |
| | | | | % PVDC solids | | | | |
| | 7.50% | 7.50% | 15.00% | 15.00% | 7.50% | 7.50% | 15.00% | 15.00% |
| | OTR* | OTR* | OTR* | | OTR* | OTR* | OTR* | OTR* |
| Day 1 | 0.0933 | | 0.0915 | | 1.6102 | | 1.2564 | |
| Day 2 | 0.0382 | | 0.0386 | | 2.2332 | | 1.2234 | |
| Day 3 | 0.0301 | | 0.0305 | | 2.2044 | | 1.3698 | |
| Day 4 | 0.0289 | | 0.0293 | | 2.2240 | | 1.353 | |

TABLE 3-continued

Saran Coated Samples - Both ends coated

| | Example | | | | | | | |
|---|---|---|---|---|---|---|---|---|
| | 1 | 2 | 3 | 4 | 5 | 6 | 7 | 8 |
| | | | | Cork Type | | | | |
| | 1S | 1S | 2S | 2S | 1N | 1N | 2N | 2S |
| | | | | % PVDC solids | | | | |
| | 7.50% OTR* | 7.50% OTR* | 15.00% OTR* | 15.00% | 7.50% OTR* | 7.50% OTR* | 15.00% OTR* | 15.00% OTR* |
| Day 5 | 0.0262 | | 0.0258 | | 2.2220 | | 1.194 | |
| Day 6 | 0.0251 | | 0.0248 | | 2.2184 | | 1.258 | |
| Day 7 | 0.0228 | | 0.023 | | 2.0976 | | 1.1932 | |
| Day 8 | 0.0223 | | 0.0219 | | 1.9648 | | 1.6856 | |
| Day 9 | 0.0208 | | 0.0207 | | 1.9150 | | 1.3365 | |
| Day 10 | 0.0212 | | 0.0211 | | 1.9560 | | 1.4543 | |
| Day 11 | 0.0204 | | 0.0206 | | 1.9662 | | 1.3652 | |
| Day 12 | | | | new samples loaded | | | | |
| Day 13 | | 0.0828 | | 0.0638 | | 3.56 | | 2.99 |
| Day 14 | | 0.0415 | | 0.0418 | | 2.05 | | 2.6 |
| Day 15 | | 0.0375 | | 0.0373 | | 3.48 | | 2.64 |
| Day 16 | | 0.0343 | | 0.0340 | | 3.55 | | 2.68 |
| Day 17 | | 0.3150 | | 0.0314 | | 3.59 | | 2.6 |
| Day 18 | | 0.0294 | | 0.0300 | | 3.65 | | 2.68 |
| Day 19 | | 0.0282 | | 0.0282 | | 3.77 | | 2.81 |
| Final OTR | 0.020 | 0.028 | 0.021 | 0.028 | 1.966 | 3.770 | 1.365 | 2.810 |

*OTR - Oxygen transmission rate in cc-cc/bottle-day-atm.

Example 5

The coating of 1 vs. 2 sides of the synthetic cork were compared. No difference was seen between coating one end of the cork versus two ends, as indicated in Table 4.

TABLE 4

Oxygen Transmission Rate* - Steady State*

| Sample | 1 Day | 5 Days |
|---|---|---|
| Synthetic - not coated | 0.18 | 0.12 |
| Synthetic - one end coated | 0.09 | 0.04 |
| Synthetic - both ends coated | 0.09 | 0.04 |

*Oxygen transmission rate in cc/bottle-day-atm.

Example 6

Synthetic corks without the coating composition were inserted into bottles to a sufficient depth such that the top of the cork was recessed two millimeters below the top of the bottle neck. Composition number 6 was then poured onto the exposed top of the cork in a quantity sufficient to fill the volume between the top of the cork and the top of the bottle such that the surface of the dried composition was nearly flush with the top of the bottle neck. After drying, it was observed that the dried composition was adherent to the glass of the bottle and to the cork, providing a permeation-resistant seal. The dried composition was sufficiently flexible to allow penetration by a conventional corkscrew for removal of the cork.

What is claimed is:

1. A process for preparing a synthetic cork closure for a liquid container having at least a portion thereof coated with a gas impermeable polymer which comprises providing a synthetic cork closure and coating at least a portion thereof with a gas impermeable polymer.

2. The process of claim 1 wherein the gas impermeable polymer is a vinylidene chloride polymer.

3. A process for preparing a synthetic cork closure having at least a portion thereof coated with a gas impermeable polymer which comprises providing a synthetic cork closure and coating at least a portion thereof with a gas impermeable polymer wherein the gas impermeable polymer is a vinylidene chloride polymer, which is (1) a copolymer of (a) from about 80 to about 93 mole percent vinylidene chloride and (b) from about 20 to about 7 mole percent of at least one monoethylenically unsaturated monomer copolymerizable therewith or (2) a copolymer of (a) from about 65 to about 75 mole percent vinylidene chloride and (b) from about 35 to about 25 mole percent of at least one monoethylenically unsaturated monomer copolymerizable therewith.

4. The process of claim 1 which comprises inserting a synthetic cork closure into a container, applying onto the free end of the synthetic cork closure a coating composition comprising a vinylidene chloride polymer dissolved in a solvent and allowing the solvent evaporate.

5. The process of claim 1 wherein only one end of the closure is coated with the gas impermeable polymer.

6. The process of claim 1 wherein both ends of the closure are coated with the gas impermeable polymer.

7. The process of claim 1 wherein the entire surface of the closure is coated with the gas impermeable polymer.

8. The process of claim 1 wherein the coating process comprises a process selected from the group consisting of analox gravure coating, offset coating, pad print coating, screen coating, stencil coating, brush coating, spray coating, pouring, painting, rolling, dipping, and dripping a composition containing the gas impermeable polymer onto the surface of the cork.

9. The process of claim 8 wherein the coating process comprises a process selected from the group consisting of analox gravure coating, offset coating, pad print coating, screen coating and stencil coating, brush coating, spray coating the composition containing the gas impermeable polymer onto the surface of the cork.

10. The process of claim 8 wherein the coating process comprises a process selected from the group consisting of painting, rolling, dipping, dripping and pouring the composition containing the gas impermeable polymer onto the surface of the cork.

11. The process of claim 1 wherein the synthetic cork closure is coated using a gas impermeable polymer in a coating composition comprising from about 5 weight percent to about 20 weight percent of a vinylidene chloride polymer, from about 70 weight percent to about 90 weight percent of an organic solvent or blend of organic solvents and from about 5 weight percent to about 10 weight percent of a thixotropic agent.

12. The process of claim 11 wherein the organic solvent is selected front the group consisting of acetone, methyl ethyl ketone, cyclohexanone, ethyl acetate, n-propyl acetate, isopropyl acetate, dibutyl ether, propylene oxide, dioxane, toluene and tetrahydrofuran and mixtures thereof.

13. The process of claim 11 wherein the coating composition has from about 70 to about 90 weight percent of a blend of organic solvents, comprising at least one solvent and a cosolvent selected from the ground consisting of aliphatic hydrocarbons, alicyclic hydrocarbons, or dialkyl ethers and mixtures thereof.

14. The process of claim 11 wherein the thixotropic agent is selected from the group consisting of fumed silica, kaopolite, bentonite, talc and mixtures thereof.

15. The process of claim 1 additionally comprising a step of drying the resulting coated synthetic cork closure.

16. The process of claim 1 wherein the liquid container is a bottle.

* * * * *